Oct. 30, 1923.
J. KERSHAW
WHEEL ATTACHMENT
Filed June 29, 1920
1,472,655
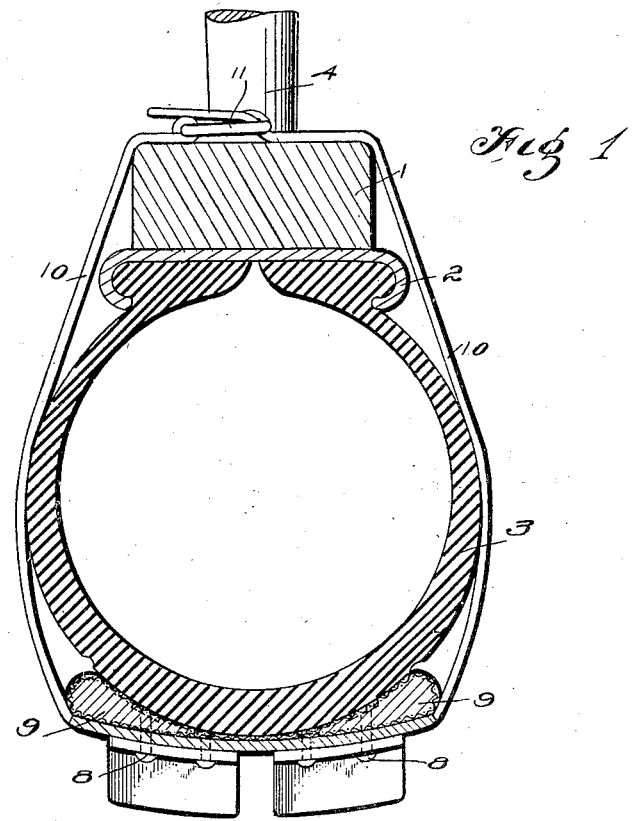
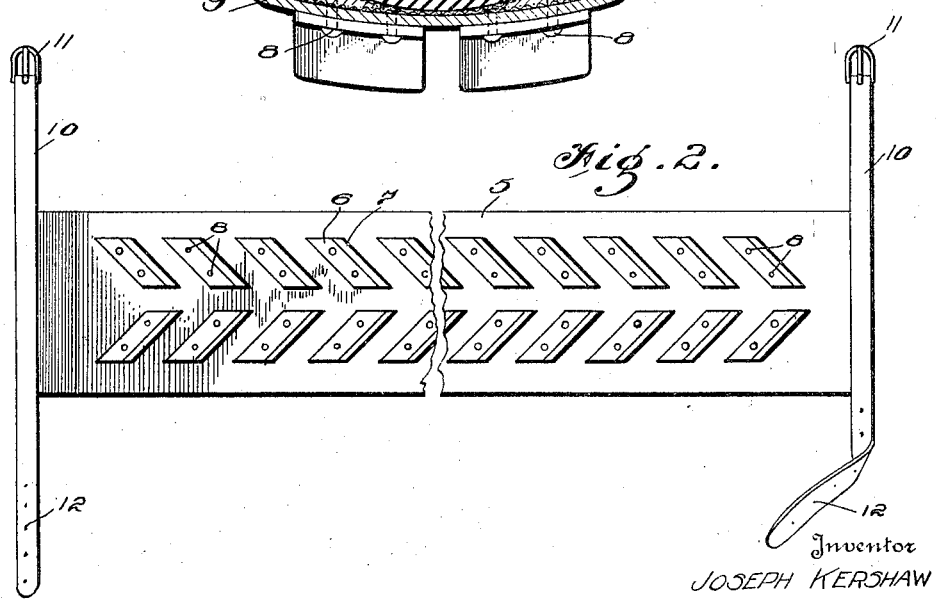
Inventor
JOSEPH KERSHAW
By
G.W. Earnshaw, Attorney Patented Oct. 30, 1923.

1,472,655

UNITED STATES PATENT OFFICE.

JOSEPH KERSHAW, OF JOPLIN, MISSOURI.

WHEEL ATTACHMENT.

Application filed June 29, 1920. Serial No. 392,684.

*To all whom it may concern:*

Be it known that I, JOSEPH KERSHAW, a citizen of the United States, residing at Joplin, in the county of Jasper and State of Missouri, have invented certain new and useful Improvements in Wheel Attachments, of which the following is a specification.

This invention relates to wheel attachments, and more particularly to attachments for wheels of motor vehicles, for the purpose of providing an increased traction surface when the vehicle is stuck in a mudhole or the like, to permit it to be driven out of the mud-hole under its own power.

An object to the present invention is to provide an attachment in the form of a substantially rigid plate having gripping lugs or plates arranged thereon, the plate being curved transversely on a radius materially greater than the curvature of the tread portion of the tire and being substantially equal in width to the width of the tread portion of the tire to provide ample traction surface and being provided with suitable pads or the like arranged between the plate and the tire, and shaped to fill the irregular space between the tire and the plate.

A further object of the invention is to provide an attachment of this character which may be readily applied to a portion of a wheel not in engagement with the ground, and the wheel revolved to bring the attachment into engagement.

In the accompanying drawings I have shown one embodiment of my invention. In this showing.

Figure 1 is a tranverse sectional view through a wheel, rim, and tire showing the device applied, and Figure 2 is a plan view of the attachment.

Referring to the drawings, the reference numeral 1 designates the felly of a wheel, a rim 2 being arranged on the felly in the usual manner, and adapted to receive a tire 3. A portion of one of the spokes of the wheel is shown and designated by the numeral 4. The parts of the wheel heretofore described are of the usual construction, and form no part of the present invention, except in the combination hereinafter set forth.

The attachment consists of a plate 5 which is substantially rigid, and preferably made of metal. As shown in Figure 1, the plate is substantially equal in width to the width of the tread portion of the tire, and is curved transversely on a radius materially greater than the curvature of the tread portion of the tire. The outer surface of the plate is provided with gripping elements or lugs which are adapted to engage the surface over which the vehicle is traveling. As shown, the gripping lugs comprise angular plates having a horizontal portion 6, secured to the plate 5, and a vertical portion 7 carried thereby. The vertical portion of the gripping lugs project radially from the surface. The gripping lugs may be secured to the plate by suitable fastening means 8, such as rivets or bolts. To properly support the plate there is provided a pad 9 of flexible material, arranged between the plate and the tire. This pad may be made of any suitable material, such as fabric, leather, or the like, and as shown, it may be secured to the plate by the fastening elements 8, which secure the gripping lugs thereto. As shown, the supporting means are preferably made to fit the space provided between the substantially flat attachment and the curved periphery of the tire, the supporting element being enlarged at the sides and being relatively thin adjacent the tread of the tire. The attachment is secured to the wheel in any suitable manner. As shown, straps 10 are arranged at each end of the attachment, and these straps are adapted to pass over the felly of the wheel and be arranged between two spokes. A buckle 11 is arranged on one end of each strap, and the other end is provided with openings 12 for the reception of the buckle.

The manner in which the device is to be used will be readily apparent from the foregoing description. When a vehicle is stuck in a mud-hole, the tread surface of the tire is unable to engage the surface of the road, and when power is applied, the wheel "spins," that is, it turns without moving longitudinally and it is impossible to drive the vehicle free from the mud-hole. Under such conditions, this attachment is applied to the surface of the wheel out of engagement with the ground, and the wheel is turned until the attachment engages the surface of the road. Because of the increased width of the tread surface provided, a relatively firm engagement with the surface of the road bed is obtained and the gripping lugs dig into the surface and form positive traction means. As shown, the lugs are arranged at an angle for the purpose of increasing their ability to furnish traction. It will be found that when this attachment is applied to a wheel and power furnished, a vehicle may be driven out of practically any mud-hole under its own power.

It is to be understood that the form of my invention herewith shown and described is to be taken as a preferred example of the same, and that various changes in the shape, size, and arrangement of parts may be resorted to without departing from the spirit of the invention or the scope of the subjoined claim.

I claim:

The combination with a vehicle wheel and a tire arranged thereon, said tire being substantially circular in cross section and being provided with a tread portion, of an attachment therefor comprising a plate adapted to be arranged on said tread portion, said plate being curved on a radius materially greater than the curvature of said tread portion, the width of said plate being substantially equal to the width of the tread portion, flexible pads arranged between the tread portion and said plate and shaped to fit snugly therein, gripping lugs secured to the outer face of said plate, said lugs extending partially across said plate, and attaching means therefor comprising straps arranged at each end of the plate and secured thereto, said straps being adapted to extend over the sides of the tire and to be fastened around the felly of the wheel.

In testimony whereof I affix my signature in presence of two witnesses.

JOSEPH KERSHAW.

Witnesses:
 A. S. Ross,
 C. H. Isaacs.